United States Patent [19]
Adapathya et al.

[11] Patent Number: 6,075,537
[45] Date of Patent: Jun. 13, 2000

[54] EASE OF USE INTERFACE TO HOTSPOTS IN HYPERTEXT DOCUMENT PAGES IN NETWORK DISPLAY STATIONS

[75] Inventors: Ravi Shankarnarayan Adapathya, Durham; Randal Lee Bertram, Raleigh; David Frederick Champion, Durham; David Andrew Sawin, Youngsville, all of N.C.

[73] Assignee: International Business Machines Corporation, Armonk, N.Y.

[21] Appl. No.: 08/975,541

[22] Filed: Nov. 20, 1997

[51] Int. Cl.⁷ .......................................................... G06F 3/14
[52] U.S. Cl. ........................... 345/357; 345/145; 345/348; 345/354; 345/339; 707/501
[58] Field of Search ..................................... 345/145, 339, 345/348, 354, 357, 336; 707/501, 513

[56] References Cited

U.S. PATENT DOCUMENTS

| | | | |
|---|---|---|---|
| 4,698,625 | 10/1987 | McCaskill et al. | 340/709 |
| 4,725,829 | 2/1988 | Murphy | 340/709 |
| 4,803,474 | 2/1989 | Kulp | 345/160 |
| 4,847,605 | 7/1989 | Callahan et al. | 340/709 |
| 5,298,890 | 3/1994 | Kanamaru et al. | 345/157 |
| 5,307,457 | 4/1994 | Beitel et al. | 395/161 |
| 5,315,313 | 5/1994 | Shinagawa | 345/145 |
| 5,565,888 | 10/1996 | Selker | 345/146 |
| 5,680,562 | 10/1997 | Conrad et al. | 345/342 |
| 5,715,416 | 2/1998 | Baker | 345/349 |
| 5,736,974 | 4/1998 | Selker | 345/146 |
| 5,790,122 | 8/1998 | Cecchini et al. | 345/357 |
| 5,806,077 | 9/1998 | Wecker | 345/146 |

OTHER PUBLICATIONS

IBM Technical Disclosure Bulletin, vol. 36, No. 4, Apr. 1993 "Method for Simplifying the Accurate Positioning of a Mouse Pointer".

*Primary Examiner*—Raymond J. Bayerl
*Assistant Examiner*—Cuong T. Thai
*Attorney, Agent, or Firm*—Joscelyn G. Cockburn; J. B. Kraft

[57] ABSTRACT

A data processor controlled user interactive display system for displaying hypertext documents, each including a sequence of display screen pages received over a communications network such as the World Wide Web. Each of the pages contains a plurality of hotspots of varying dimensions, each of said hotspots being responsive to user interactive pointing means to display a linked document. The system has means for determining the dimensions and positions of said hotspots on said display page and means responsive to said determining means for dynamically creating a plurality of expanded hotspot zones, each respectively including one of said hotspots. The system then provides means responsive to said user interactive pointing means within a selected hotspot zone to display the document linked to the hotspot in said zone. These hotspot zones are highlighted when the user points to them to provide the user with a large and highly visible target zone within which he may access his selected hotspot.

27 Claims, 7 Drawing Sheets

EASE OF USE INTERFACE TO HOTSPOTS IN HYPERTEXT DOCUMENT PAGES IN NETWORK DISPLAY STATIONS

TECHNICAL FIELD

The present invention relates to computer managed communication networks and particularly to ease of use interactive computer controlled display interfaces to the hotspots in received hypertext documents which interactively link users from such documents to other documents, media and programs.

BACKGROUND OF THE INVENTION

The 1990's decade has been marked by a societal technological revolution driven by the convergence of the data processing industry with the consumer electronics industry. Like all such revolutions, it unleashed a significant ripple effect of technological waves. The effect has in turn driven technologies which have been known and available but relatively quiescent over the years. A major one of these technologies is the internet-related distribution of documents, media and programs. The convergence of the electronic entertainment and consumer industries with data processing exponentially accelerated the demand for wide ranging communications distribution channels, and the World Wide Web or internet which had quietly existed for over a generation as a loose academic and government data distribution facility reached "critical mass" and commenced a period of phenomenal expansion. With this expansion, businesses and consumers have direct access to all matter of documents, media and computer programs.

As a result of these changes, it seems as if virtually all aspects of human endeavor in the industrialized world requires human-computer interfaces. Thus, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are intuitive and forgive any impreciseness on the part of users. This is particularly needed with respect to the World Wide Web or internet. Users must be able to readily display documents in a clear and comprehensive manner in natural language. Hypertext Markup Language (HTML), which had been the documentation language of the internet World Wide Web for years, offered an answer. It offered direct links between pages and other documentation on the Web and a variety of related data sources which were, at first, text and then evolved into media, i.e. "hypermedia".

With all of these rapidly expanding functions of Web pages and like documentation, it should be readily understandable that the demand for Web documents has been expanding exponentially in recent years. In addition to the proliferating standard uses of HTEL for text and media related World Wide Web pages for commercial, academic and entertainment purposes, there is now a Java documentation program, JavaDoc, which will produce standard HTML files for outputs to computer controlled displays to provide standard natural language displays of the program documentation. Thus, HTML has become the display language of choice for the internet or World Wide Web. It is used there for all forms of display documentation including the markup of hypertext and hypermedia documents which are usually stored with their respective documents on an internet or Web server in addition to the above-mentioned program documentation functions. HTML is an application of SGML (Standard Generalized Markup Language), an ISO standard for defining the structure and contents of any digital document. It should be recognized that any of the aspects of the present invention illustrated with respect to HTML would be equally applicable to SGML. For further details on JavaDoc or HTML, reference may be made to the texts "just Java", 2nd Edition, Peter van der Linden, Sun Microsystems, Inc., 1997, or "Java in a Nutshell", 2nd Edition, by David Flanagan, O'Reilly publisher, 1997.

We have found that the human factors/ease of use interface functions of the World Wide Web have not advanced as swiftly as have the rapid expansion of the many other Web functions. There have been great efforts among the providers of Web function to try to standardize the interfaces used in Web browsers, for example the Web Browser Interface (WBI). However, its user interfaces to hotspots, i.e. links to hypertext and hypermedia embedded in the textual and graphic materials on Web pages, have not changed very much from when the demand for Web pages and related documentation was relatively modest and the user base was a much more computer-elite and sophisticated group. Traditional pointing devices such as mice, wands or joysticks have been used in accessing such hotspots. These pointing devices require two types of coordinated physical movements: a gross movement to the proximity of the hotspot and then a fine movement to the hotspot itself. This requires an unusual amount of physical dexterity and may often lead to frustration, particularly if the users are unsophisticated in computer gestures. Years ago when mouse/icon graphic interfaces to computer displays were being developed, the problem was recognized by interface designers, they tried to design graphic interfaces which took these movements and gestures into account in providing sufficient spacing around icons.

However, in the case of Web pages, we do not have the situation of a relatively small group of professional designers working out the human factors; rather in the era of the Web, anyone and everyone can design a Web page. Thus, while hotspots in Web pages may be icons, they are more likely to be textual and embedded in adjacent text and emphasized as hotspots merely by being underlined or of a different color or boldness from adjacent text. But even where the hotspots are icons or other graphics, their page layouts are often made by developers without graphic skills. In addition, it is the nature of Web pages that they are frequently modified to include new hotspots, and the addition of hotspots rarely involve an overall page redesign.

The present invention provides a solution to the problem of improving the interface and access to hotspots in received Web pages by dynamically reorganizing the hotspots on each page received at the user's display station into a layout of displayed hotspot zones which are much more accessible to the user and are very forgiving with respect to both Web page hotspot design limitations as well as user limitations in gesture skills with the pointing devices.

SUMMARY OF THE INVENTION

The present invention relates to a computer controlled display system for displaying documents, e.g. Web pages including natural language text received at display stations, particularly when transmitted from locations remote from the receiving stations. The document received is made up of a sequence of screen pages, each containing a plurality of hotspots of varying dimensions, each of said hotspots being responsive to user interactive pointing means to display a linked document. The invention involves dynamically restructuring each page in the received document so that the selection of hotspots is made more user friendly and accessible.

The invention accomplishes this by determining the dimensions and positions of said hotspots on said display page and then dynamically creating a plurality of expanded hotspot zones, each respectively including one of said hotspots based on these dimensions and positions. The invention further includes means responsive to said user interactive pointing means within a selected hotspot zone to display the document linked to the hotspot in said zone. Thus, the restrictive hotspots are dynamically expanded into more easily accessible hotspot zones. The expanded zones are large enough to now be more easily accessed by users using ordinary cursor pointing means such as mice. Since the invention dynamically rezones hotspots in received documents, a convenient and accessible hotspot arrangement is provided irrespective of any hotspot design limitations in the original document or its pages. The rezoning may preferably be so extensive that the hotspot zones partition the page so that there is always an active zone, i.e. the zone of the hotspot to which the cursor is closest. Alternatively, the zones may be angular determined by the direction of cursor movement from a home or initial hotspot on each displayed page. In such a case, the hotspot zones are areas defined by angles extending from said initial hotspot as a vertex. In the embodiment with such radial zones, the direction of the cursor movement will determine the hotspot zone which the user is moving his cursor to select. In the case of the present invention wherein the cursor will always be in a selected hotspot zone, the whole hotspot zone containing the cursor or a significant portion of the zone is preferably highlighted. This aspect is particularly effective in interactive displays for Web browsing where the user is in a living room environment with a set top box or like terminal which is in the order of 10 feet from the user instead of the usual 1 to 2 feet on a computer terminal.

It should be noted that in the case of the radial zones, a home or initial hotspot for browsing should be predetermined for each page. This could be based on the likelihood of selection of the particular hotspot, e.g., in the case of Web pages, it could be the hotspot linking to a document, page or Web site which has been getting the most "hits" at a given time. In such a case, the initial hotspot would not need to be preselected by the page designer but could be dynamically and heuristically determined by the system if some means for tracking hits were available.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable. Reference has also been made to the applicability of the present invention to a global network such as the internet. For details on internet nodes, objects and links, reference is made to the text, *Mastering the Internet*, G. H. Cady et al., published by Sybex Inc. Alameda, Calif., 1996.

Any data communication system which interconnects or links computer controlled systems at various sites defines a communications network. A network may be as simple as two linked computers or it may be any combination of LANS (Local Area Networks) or WANS (Wide Area Networks). Of course, the internet or World Wide Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. The HTML language is described in detail in the above "Just Java" text and particularly at Chapter 7, pp. 249–268, dealing with the handling of Web pages with embedded hotspot activated linkages and also in the text, "Mastering the Internet", Cady and McGregor, published by Sybex, San Francisco, 1996 and particularly pp. 637–642 on HTML in the formation of Web pages.

Figure 1:
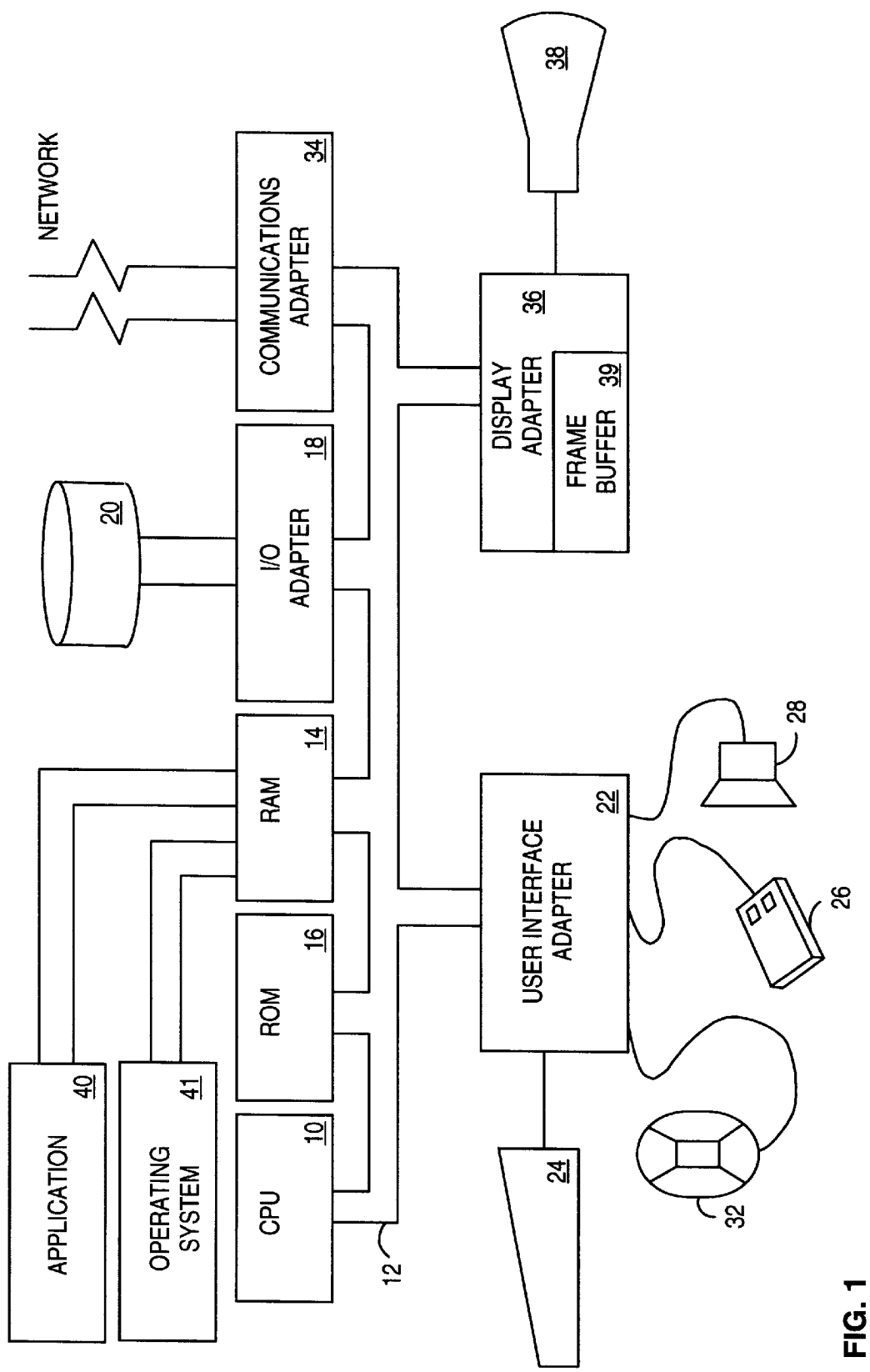
FIG. 1 is a block diagram of a data processing system including a central processing unit and network connections via a communications adapter which is capable of implementing a user interactive workstation on which the received data may be converted into a Web page in accordance with the present invention.

Referring to FIG. 1, a typical data processing system is shown which may be used in conjunction with HTML in implementing the present invention on the receiving interactive workstation. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as Windows 95 (TM of Microsoft Corporation) or the OS/2 operating system available from International Business Machines Corporation (OS/2 is a trademark of International Business Machines Corporation). Any conventional network browser system involving HTML language with embedded hotspots or links forms part of application 40, runs in conjunction with operating system 41 and provides output calls to the operating system 41 which implements the various functions to be performed by the HTML application 40. Also included in the application software 40 will be the applications of this invention for expanding hotspots into displayed hotspot zones to be subsequently described in detail. The browser program, in combination with the operating system, provides the basic receiving workstation on which the Web pages are received after which the program of the present invention may be dynamically implemented. In this connection, there is Internet Explorer 4.0 browser operative with Windows 95 which has an "Active Desktop" routine which could be modified to implement the hot zone program of this invention.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the browser, HTML and dynamic hotspot zone expansion applications 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the workstation to communicate with Web servers to receive document pages over a local area network (LAN) or wide area network (WAN) which includes, of course, the internet or World Wide Web. I/O devices are also connected to system bus 12 via user interface adapter 22 and display adapter 36. Keyboard 24, trackball 32 and mouse 26 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and other information to the system through the trackball 32 or mouse 26 to make hotspot selections and receiving output information from the system via display 38.

Before we proceed further with the description of our basic embodiments, we should consider some additional background with respect to Web pages. Users of the Web do not need to know the addresses of pages or documents which they wish to reach as long as they are aware of the links to such documents. Because of the ease and availability of Web browsers, an almost unimaginable number and variety of pages and topics are available at low cost to tens of millions of users. The Web links are stored within the page itself and when the user wishes to jump to a linked page, he moves to and clicks on the hotspot or hotspot zone in the case of the present invention. The growth and rapidly increasing importance of the Web is based on the ability to build such linked information resources which may be reached without a series of menus. Unlike other database access systems, everyone on the Web has the ability to incorporate additional information. The basic transmittable unit on the Web is the hypertext page, which is customarily organized in HTML (Hypertext Markup Language). For additional details on the foregoing, reference may be made to the above-mentioned Cady et al. text, *Mastering the Internet*.

Figure 2:
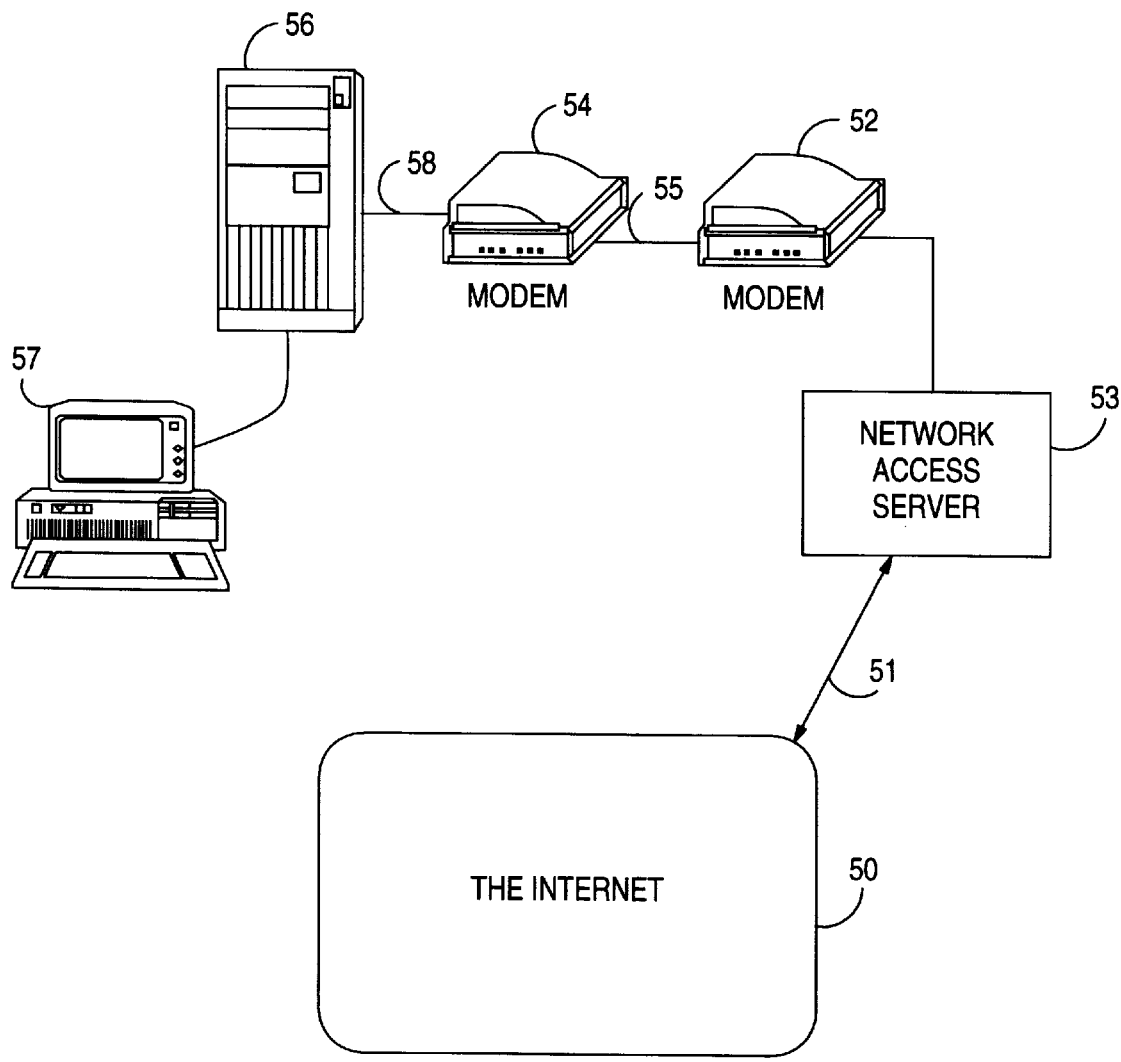
FIG. 2 is a generalized diagrammatic view of an internet portion upon which the present invention may be implemented.

A generalized diagram of a portion of an internet, which the computer 56 controlled display terminal 57 used for Web page or other document display of the present invention, is connected as shown in FIG. 2. Computer 56 and display terminal 57 are the computer system shown in FIG. 1 and connection 58 (FIG. 2) is the network connection shown in FIG. 1.

Reference may be made to the above-mentioned text, *Mastering the Internet*, Cady et al., particularly at pp. 136–147 for typical connections between local display workstations to the internet via network servers any of which may be used to implement the system on which this invention is used. The system embodiment of FIG. 2 is one of these known as a host-dial connection. Such host-dial connections have been in use for over 30 years through network access servers 53 which are linked 51 to the net 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling computer 56 via the telephone line linkages from server 53 which may have accessed them from the internet 50 via linkage 51. The dynamic restructuring of the hotspots on received Web pages to the hotspot zones of the present invention as described herein will be carried out on computer 56 and displayed and accessed on display terminal 57.

Figure 3:
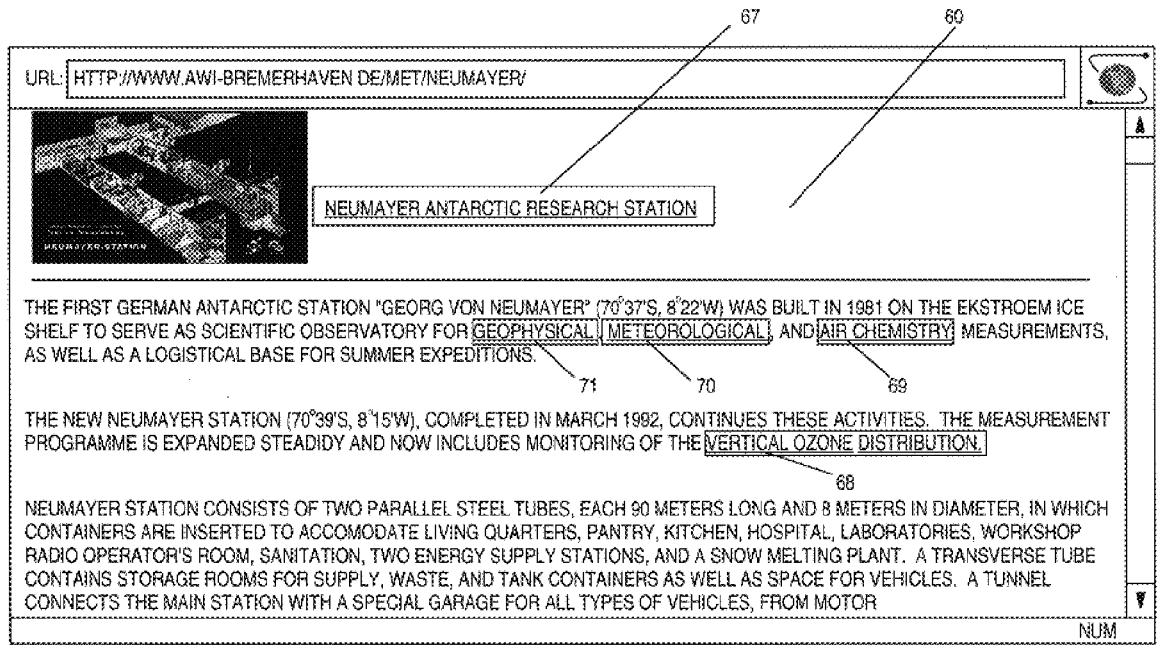
FIG. 3 is a diagrammatic view of a typical Web page with the areas of the hotspots emphasized.

The present invention will now be described initially with respect to FIGS. 3 and 4. FIG. 3 shows a typical Web page 60 which may be received via the World Wide Web. It contains hotspots such as terms 67, 68 and 69. On the present page, these have been received and underlined to designate them as hotspots. We have boxed in each term to show the extent of the hotspot which the user must normally skillfully maneuver to with his pointer or cursor in order to make an appropriate selection. It should be noted that this would be even more troublesome with hotspots such as hotspots 70 and 71, which are adjacent to each other.

Figure 4:
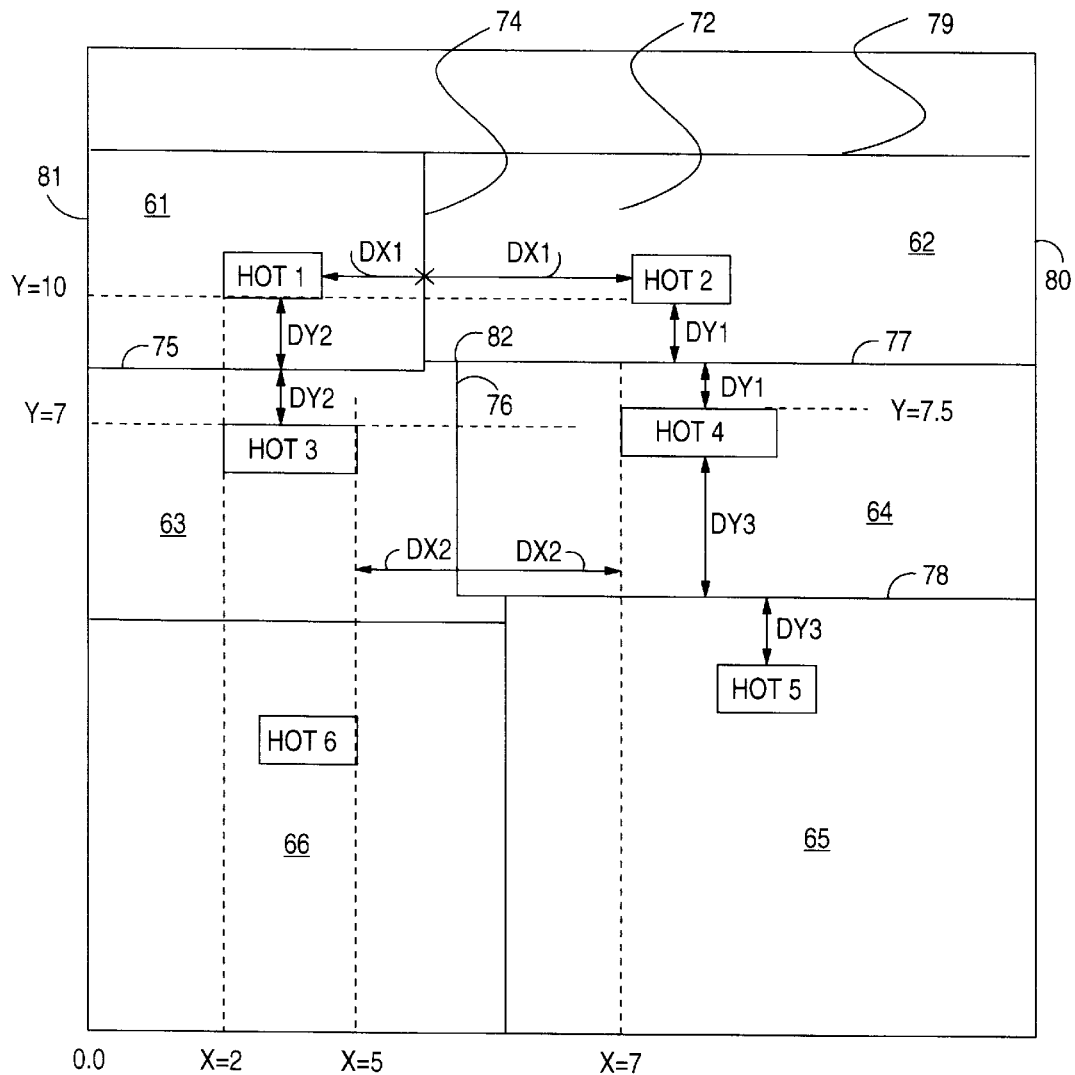
FIG. 4 is a diagrammatic view of a Web page with all text removed to show the original hotspots as well as their respective hotspot zones in accordance with this invention.

FIG. 4 shows how the Web page, in accordance with the present invention, solves the problem by providing an interface gross user access to hotspots. The configuration shown in FIG. 4 is dynamically generated at the receiving station, e.g. the station comprising computer 56 and display 57 of FIG. 2. In order to more clearly describe the interface, all text and graphics have been removed from the Web page 72 in FIG. 4 to show only the hotspots labelled HOT 1 through HOT 6, each with its respective effective area boxed in. The system of the invention dynamically expands the effective areas of the respective hotspots to hot zones as follows: HOT 1 to zone 61, HOT 2 to zone 62, HOT 3 to zone 63, HOT 4 to zone 64, HOT 5 to Zone 65 and HOT 6 to zone 66. It should be noted that these zones do not normally show up on the display screen; the text with its embedded hotspots appears to be normal but when the cursor enters any part of a selected zone either the hotspot or even its whole zone is highlighted to indicate the selection.

Figure 4A:
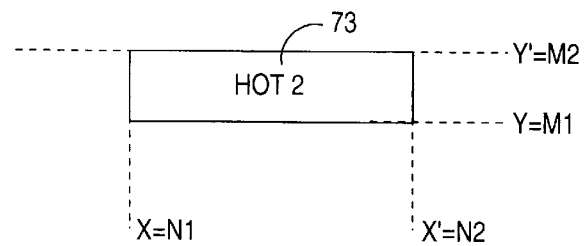
FIG. 4A is a diagram illustrating how the dimensions and position of a hotspot may be determined in the practice of the present invention.

The zones may be set up dynamically by any program routine which implements the following algorithm. The hotspots are defined in terms of their orthogonal coordinates. FIG. 4A shows how a standard hotspot 73 may be defined by the orthogonal coordinates of the four lines defining its sides: $x=n1$; $x'=n2$; $y=m1$; $y'=m2$ which also serve to define the hotspot position on the page. Actually, this data should be part of the Hypertext Markup Language (HTML) which is received defining the page and readily determined from such data. Then, for each side of each hotspot, the closest other hotspot is determined and the distance between them is halved. Thus, in the x orthogonal direction, we have line 74 equidistant by distance DX1 from HOT1 and from HOT2 and thus defining their respective zones 61 and 62. In the y direction from HOT1, we have line 75, equidistant by distance DY2 from HOT1 and from HOT3, and thus defining their respective zones 61 and 63. Also in the y direction, we have line 77 equidistant by distance DY1 from HOT2 and from HOT4, and thus defining zones 62 and 64, and line 78, equidistant by a distance DY3 from HOT4 and from HOT5, and thus defining zones 64 and 65. In addition, in the x direction, we have line 76 equidistant by a distance DX2 from HOT3 and from HOT4 and thus defining zones 63 and 64. Because there are no other hotspots between HOT1 and HOT3 respectively and side edge 81, zones 61 and 63 both extend to edge 81. Likewise, because there are no other hotspots between HOT2 and HOT4 respectively and side edge 80, zones 62 and 64 both extend to edge 80. Similarly, zones 61 and 62 both extend to top edge 79. In this manner, hotspot zones 61 through 66 may be dynamically created at the receiving terminal. These zones are many times the areas of their respective hotspots and may be easily accessed through gross user pointing gestures. Customarily, when a user moves his cursor into, for example, zone 64, the whole zone is highlighted to indicate that its hotspot, HOT4 is now selectable; the user may then do so by appropriate mouse clicking.

Figure 6:
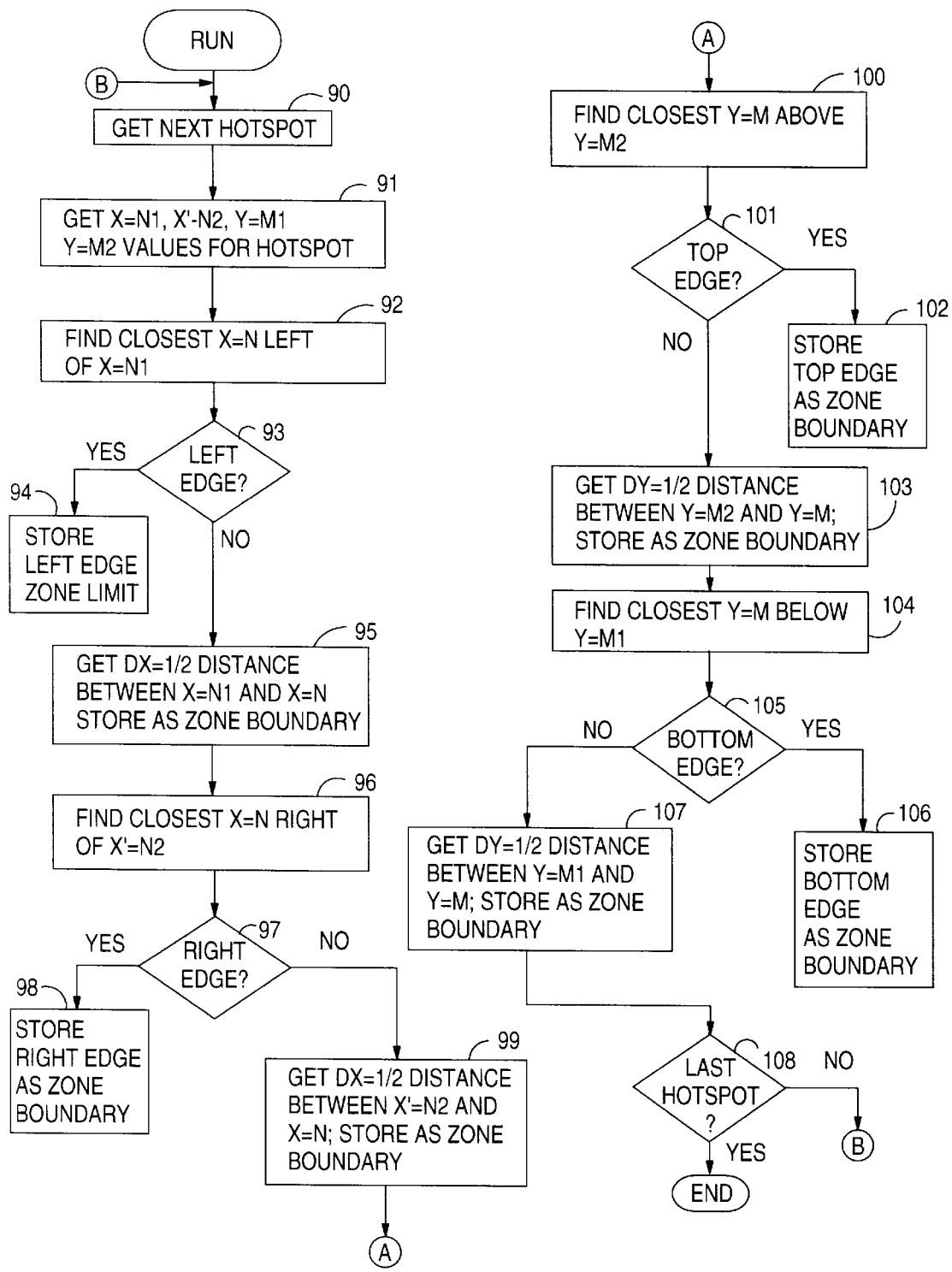
FIG. 6 is a flowchart of a program which may be used to dynamically generate Web page interface having the hotspot zones of the page of FIG. 4.

It should be readily understood by those skilled in the art how the zones on the display screen of FIG. 4 may be created. There will now be described with respect to FIG. 6 an example of an algorithm for dynamically creating such zones. When the document containing hotspots is received at the display terminal, the program of FIG. 6 is run. First, the next hotspot is accessed, step 90 which may be the initial hotspot, e.g. HOT1 (FIG. 4). Then, step 91, the dimensions for the hotspot are obtained. These dimensions, shown in FIG. 4A, serve to determine both the position and dimensions. Then, step 92, the closest x=n to the left of the hotspot is sought. Note x=n is the orthogonal line defining a hotspot edge. A determination is made, decision step 93, as to whether the left edge has been reached, i.e. there is no x=n between the hotspot and the left edge as happens to be the case with HOT1. Then the left edge 81 of the screen window is stored as the zone boundary, step 94. On the other hand, step 95, if there is an x=n line defining the edge of an adjacent hotspot, then the distance between hotspot edges is halved to a DX and stored as a zone boundary.

Next, step 96, the closest x=n to the right of the hotspot is sought. Again, a determination is made in this case whether the right edge has been reached, step 97, and if so, then it is stored as a zone boundary, step 98. In the example of FIG. 4, using HOT1 as the initial hotspot, another boundary, x=n1 of HOT2 is encountered, and step 99, DX1 is calculated as half the distance between HOT1 and HOT2 to provide boundary 74 between zones 61 and 62 as previously described. Next, the system flows via branch A to step 100 and the closest y=m above the hotspot is sought. Note y=m is the orthogonal line defining a hotspot edge in the y direction. A determination is made, step 101 as to whether the top of the screen window has been reached before any y=m is encountered. If the top has been reached as with HOT1, FIG. 4, then, step 102, the top edge is stored as the zone boundary. Otherwise, step 103, as previously described with respect to x boundaries, ½ the distance between the edges of adjacent hotspots is calculated and stored as the boundary between the respective zones of the adjacent hotspots. Next, step 104, the closest y=m below the hotspot is sought. A determination is made, step 105 as to whether the bottom of the screen window has been reached before any y=m is encountered. If it has, then the bottom edge of screen is stored as a zone boundary, step 106. In the example of FIG. 4 using HOT1 as the initial hotspot, another boundary, y'=m2 of HOT3 is encountered, and step 107, DY2 is calculated as half the distance between HOT1 and HOT3 to provide boundary 75 between zones 61 and 63, as previously described. We have now dealt with the four edges of the first hotspot. At this point, a determination is made, step 108, as to whether we are at the last hotspot; if yes, then the process would end. Since this is not the last hotspot, the process branches back to initial step 90 via point B and each hotspot is processed in the manner described.

Figure 6A:
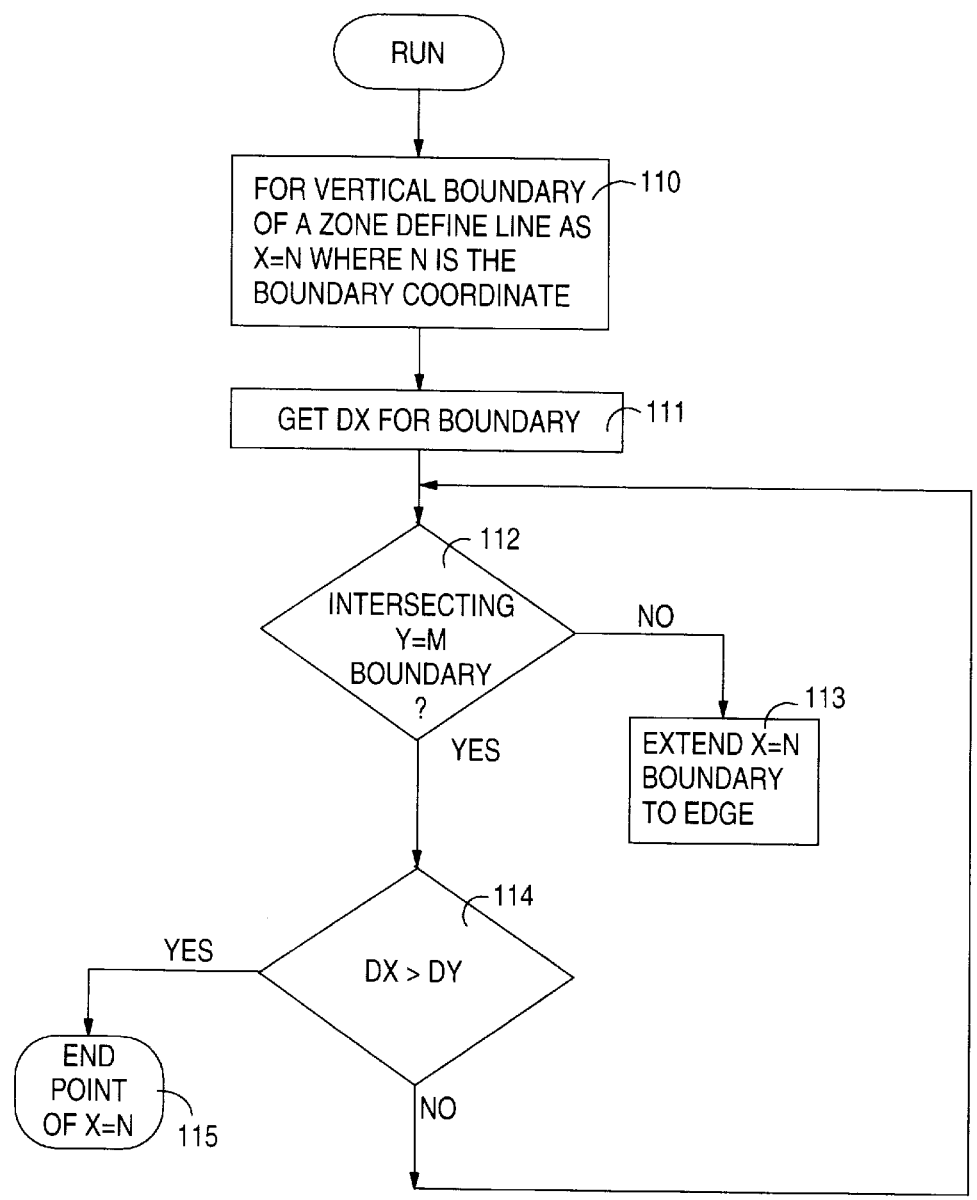
FIG. 6A is a flowchart of a programming routine which may be used to generate the zone boundary end points and intersections of the boundary lines formed by the program described in FIG. 6.

The above program is satisfactory for defining the boundary lines between zones such as line 76 in FIG. 4, between zones 63 and 64, but the points of intersection between boundary lines extending in directions orthogonal to each other should be considered, e.g. the intersection of line 76 with line 77 which is the Y boundary between zones 62 and 64. A simple routine for doing this is suggested via the flowchart of FIG. 6A. Start with a defined boundary defined in terms of X=n, step 110, e.g. line 76, FIG. 4. Get DX, distance along the x axis from its hotspots, step 111. With line 76, this would be the distance DX2. Next, decision step 112, does it intersect a y>m zone boundary line. If no, the zone boundary line could be extended to an edge, either top or bottom, step 113. However, if, as in the case of line 76, intersecting y boundary line 77, there is an intersection, then a determination is made, step 114, as to whether DX>DY where DX is the above-mentioned DX2 and DY is DY1 in FIG. 4, which is the half distance between HOT2 and HOT4 along the y axis. Thus, boundary line 76 may extended to the point when DX2 will begin to exceed DY1, at which point line 76 will end, step 115, at intersection 82. This procedure may be repeated with each hotspot as required in determining zone boundary lines in both orthogonal directions.

Figure 5:
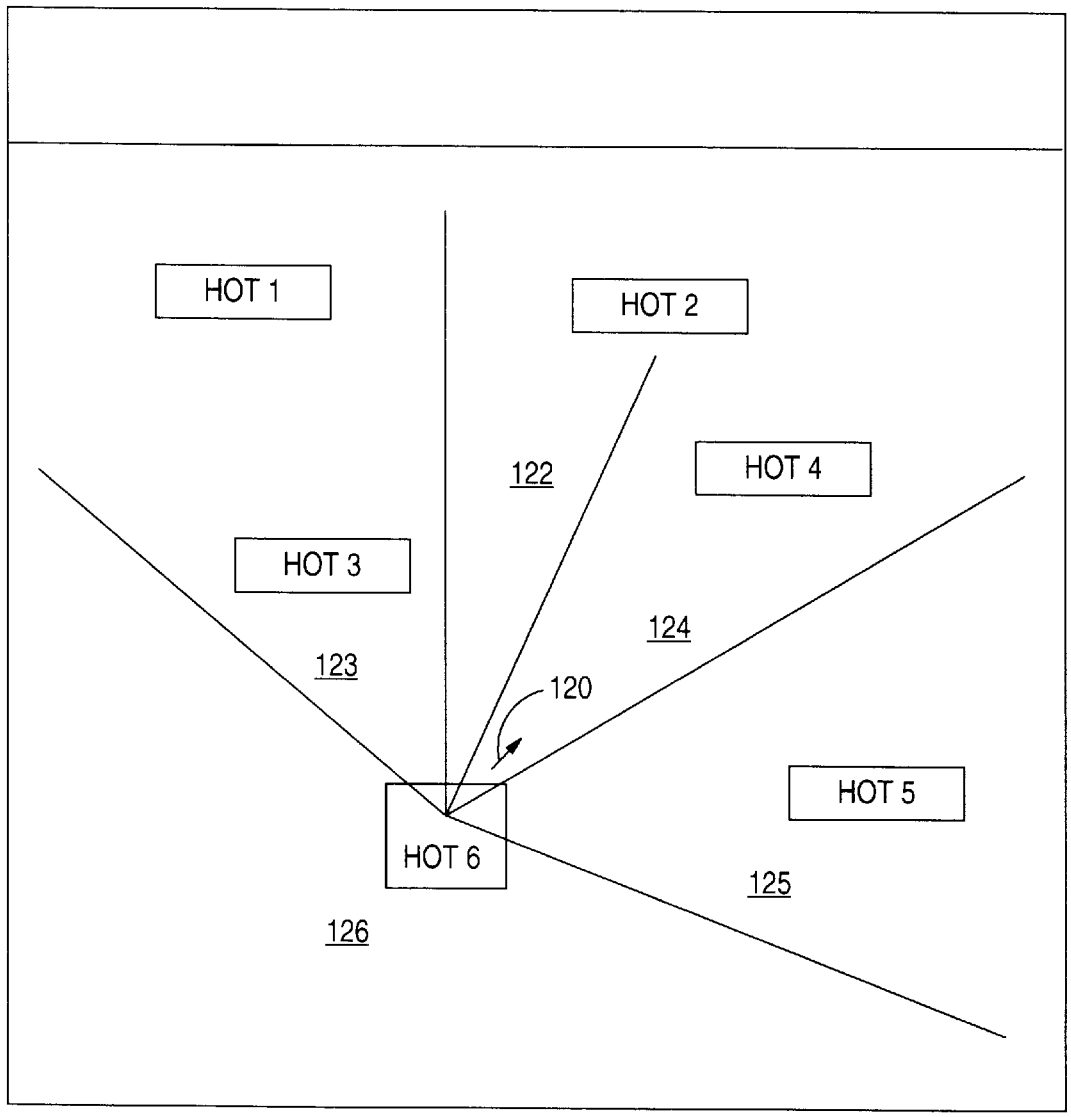
FIG. 5 is the diagrammatic view of a Web page of FIG. 4 but arranged to show how the page may be divided into radial zones in accordance with another aspect of the present invention.

An alternative system for dynamically providing a hot zone interface from a received display page with hotspot is given with respect to FIG. 5. This involves the creation of radial hot zones which radiate from an initial or home hotspot in the directions of the other hotspots on the page. FIG. 5 shows the same diagrammatic Web page as that of FIG. 4 but subjected to a radial arrangement of hot zones. In providing such a radial arrangement, an initial or home hotspot must be selected, which in FIG. 5 is HOT6. The selection may initially be made by the user or it may be made dynamically by the system. If the system selects the home hotspot, then the choice may be based on hotspot activity, i.e the Web activity or number of hits on the hypertext associated with the hotspot at various Web levels as tracked by the system. of course, the selection of the initial hotspot could be based on properties other than activity. For example, it could be the hotspot from which the other hotspots are most accessible radially.

As is evident from FIG. 5, each hotspot zone, 122 through 126, respectively associated with one of hotspots HOT2 through HOT6 is allocated an angle of an appropriate magnitude and direction so that a user moving a cursor or other gestural pointing device in a direction from the initial HOT6 toward a selected hotspot would activate the zone associated with the hotspot, and that zone would become highlighted. For example, a movement of cursor 120 from HOT6 toward HOT4 in the direction shown in FIG. 5 results in the lighting up of zone 124. Any conventional geometric algorithm for providing radial lines from a center vertex and an array of points may be used in providing the radial zones of FIG. 5. In the arrangement as shown, HOT1 is completely blocked radially by HOT3. With such a radial system as that of FIG. 5, when proceeding from an initial hotspot, it should be expected that some hotspots will be radially blocked by other hotspots between the blocked hotspot and the initial hotspot, particularly in cases involving complex pages with many hotspots. In such cases, it may be necessary for the system to provide for secondary home hotspots which are radially accessible from the initial hotspot and from which secondary hotspot, such initially blocked hotspots are accessible.

Although certain preferred embodiments have been shown and described, it will be understood that many changes and modifications may be made therein without departing from the scope and intent of the appended claims.

What is claimed is:

1. In a data processor controlled user interactive display system for displaying hypertext documents, each including a sequence of at least one display screen page containing a plurality of hotspots of varying dimensions, each of said hotspots being responsive to user interactive pointing means to display a linked document, the improvement comprising:

means for determining the dimensions and positions of said hotspots on said display page, means responsive to said determining means for dynamically creating a plurality of expanded hotspot zones, each respectively including one of said hotspots, and means responsive to said user interactive pointing means within a selected hotspot zone to display the document linked to the hotspot in said zone.

2. The interactive display system of claim 1 wherein said pointing means comprises a user controlled cursor and further including means for determining whether said cursor is within a hotspot zone.

3. The interactive display system of claim 2 further including means for determining an initial hotspot on said display page, and wherein said hotspot zones are areas defined by angles extending from said initial hotspot as a vertex.

4. The interactive display system of claim 3 further including means for determining whether said cursor is within a hotspot zone based upon the direction of movement of said cursor.

5. The interactive display system of claim 2 further including means for highlighting the hotspot zone which the cursor is within.

6. In a computer managed communication network with user access via a plurality of data processor controlled interactive display stations with a system for displaying hypertext documents transmitted to said display stations from locations remote from said stations, said documents including a sequence of at least one display screen page containing a plurality of hotspots of varying dimensions, and each of said hotspots being responsive to user interactive pointing means to display a linked document, the improvement comprising:

means for determining the dimensions and positions of said hotspots on said display page, means responsive to said determining means for dynamically creating a plurality of expanded hotspot zones, each respectively including one of said hotspots, and means responsive to said user interactive pointing means within a selected hotspot zone to display the document linked to the hotspot in said zone.

7. The communications network of claim 6 wherein said pointing means comprises a user controlled cursor and further including means for determining whether said cursor is within a hotspot zone.

8. The communications network of claim 7 further including means for determining an initial hotspot on said display page, and wherein said hotspot zones are areas defined by angles extending from said initial hotspot as a vertex.

9. The communications network of claim 8 further including means for determining whether said cursor is within a hotspot zone based upon the direction of movement of said cursor.

10. The communications network of claim 7 further including means for highlighting the hotspot zone which the cursor is within.

11. The communications network of claim 8 wherein said means for determining said initial hotspot is based upon the activity in selecting said hotspot in documents transmitted within said network.

12. In a computer implemented method for displaying hypertext documents, each including a sequence of at least one display screen page containing a plurality of hotspots of varying dimensions, each of said hotspots being responsive to user interactive pointing means to display a linked document, the improvement comprising:

determining the dimensions and positions of said hotspots on said display page, responsive to said determination, dynamically creating a plurality of expanded hotspot zones, each respectively including one of said hotspots, and displaying the document linked to the hotspot in a selected zone in response to said user interactive pointing within said selected hotspot zone.

13. The method of claim 12 wherein said pointing comprises user interactively controlling a cursor and determining whether said cursor is within a hotspot zone.

14. The method of claim 13 further including the step of determining an initial hotspot on said display page, and wherein said hotspot zones are areas defined by angles extending from said initial hotspot as a vertex.

15. The method of claim 14 further including the step of determining whether said cursor is within a hotspot zone based upon the direction of movement of said cursor.

16. The method of claim 13 further including the step of highlighting the hotspot zone which the cursor is within.

17. In a computer managed communication network with user access via a plurality of data processor controlled interactive display stations, a system for displaying hypertext documents transmitted to said display stations from locations remote from said stations, and said documents including a sequence of at least one display screen page containing a plurality of hotspots of varying dimensions, each of said hotspots being responsive to user interactive pointing means to display a linked document, a method for accessing hotspots in a document page received at a display station comprising:

determining the dimensions and positions of said hotspots on said received display page, responsive to said determination, dynamically creating a plurality of expanded hotspot zones, each respectively including one of said hotspots, and displaying the document linked to the hotspot in a selected zone in response to said user interactive pointing within said selected hotspot zone.

18. The method of claim 17 wherein said pointing comprises user interactively controlling a cursor and determining whether said cursor is within a hotspot zone.

19. The method of claim 18 further including the step of determining an initial hotspot on said display page, and wherein said hotspot zones are areas defined by angles extending from said initial hotspot as a vertex.

20. The method of claim 19 further including the step of determining whether said cursor is within a hotspot zone based upon the direction of movement of said cursor.

21. The method of claim 18 further including the step of highlighting the hotspot zone which the cursor is within.

22. The method of claim 19 wherein said step of determining said initial hotspot is based upon the activity in selecting said hotspot in documents transmitted within said network.

23. In a computer program having data structures included on a computer readable medium for displaying, on a data processor controlled user interactive display system, hypertext documents, each including a sequence of at least one display screen page containing a plurality of hotspots of varying dimensions, each of said hotspots being responsive to user interactive pointing means to display a linked document, the improvement comprising:

means for determining the dimensions and positions of said hotspots on said display page, means responsive to said determining means for dynamically creating a plurality of expanded hotspot zones, each respectively including one of said hotspots, and means responsive to said user interactive pointing means within a selected hotspot zone to display the document linked to the hotspot in said zone.

24. The computer program of claim 23 wherein said pointing means comprises a user controlled cursor and further including means for determining whether said cursor is within a hotspot zone.

25. The computer program of claim 24 further including means for determining an initial hotspot on said display page, and wherein said hotspot zones are areas defined by angles extending from said initial hotspot as a vertex.

26. The computer program of claim 25 further including means for determining whether said cursor is within a hotspot zone based upon the direction of movement of said cursor.

27. The interactive display system of claim 24 further including means for highlighting the hotspot zone which the cursor is within.

* * * * *